United States Patent [19]

Abstetar et al.

[11] Patent Number: 4,944,612
[45] Date of Patent: Jul. 31, 1990

[54] TRUCK BED LINER

[76] Inventors: Michael J. Abstetar, 19 Hein Ave., Plymouth, Wis. 53073; Richard W. Koppitz, 2001 N. 19th St., Sheboygan, Wis. 53081

[21] Appl. No.: 416,409

[22] Filed: Oct. 3, 1989

[51] Int. Cl.⁵ .............................. B60R 13/01
[52] U.S. Cl. ..................... 296/39.2; 296/97.23
[58] Field of Search ............... 296/39.1, 39.2, 97.23, 296/38, 208; 224/42.42

[56] References Cited

U.S. PATENT DOCUMENTS

| | | | |
|---|---|---|---|
| 2,650,855 | 9/1953 | Peirce | 296/97.23 |
| 3,050,329 | 8/1962 | Pagan | 296/97.23 |
| 3,143,373 | 8/1964 | Fordyce | 296/208 X |
| 4,333,678 | 6/1982 | Munoz et al. | 296/39.2 |
| 4,336,963 | 6/1982 | Nix et al. | 296/39.2 |
| 4,341,412 | 7/1982 | Wayne | 296/39.2 |
| 4,505,508 | 3/1985 | Carter et al. | 296/39.2 |
| 4,707,016 | 11/1987 | McDonald | 296/39.2 |
| 4,752,097 | 6/1988 | Van Kirk et al. | 296/39.2 |
| 4,767,149 | 8/1988 | Rye | 296/39.2 |

FOREIGN PATENT DOCUMENTS 820058 9/1959 United Kingdom ............ 296/97.23

Primary Examiner—Margaret A. Focarino
Assistant Examiner—Gary C. Hoge
Attorney, Agent, or Firm—Francis J. Bouda

[57] ABSTRACT

A multi-piece liner is disclosed for snap-in attachment and securement to the bed of an open-bodied truck. The liner includes at least a right-side panel, a left-side panel, and a cab-back panel, and may also include a tailgate panel and a floor panel. The side panels are generally C-shaped and constructed and arranged to fit between the in-turned upper edge of the truck body and the floor of the truck body, to be held in place by compression-retention and including flanges on the cab-back panel which rest behind portions of the right and left panels to hold the cab-back panel in place. The floor panel may include tubes and the cab-back panel may include notches which permit fluid to drain from the upper surface of the floor mat and also which includes ribs beneath the floor mat to space the floor mat from the bottom of the truck body. The bed liner may also include a two-piece tailgate panel, one piece having a curved edge which fits over the top of the tailgate. All of the panels can be assembled into the vehicle bed without any additional fasteners or holding devices.

6 Claims, 3 Drawing Sheets

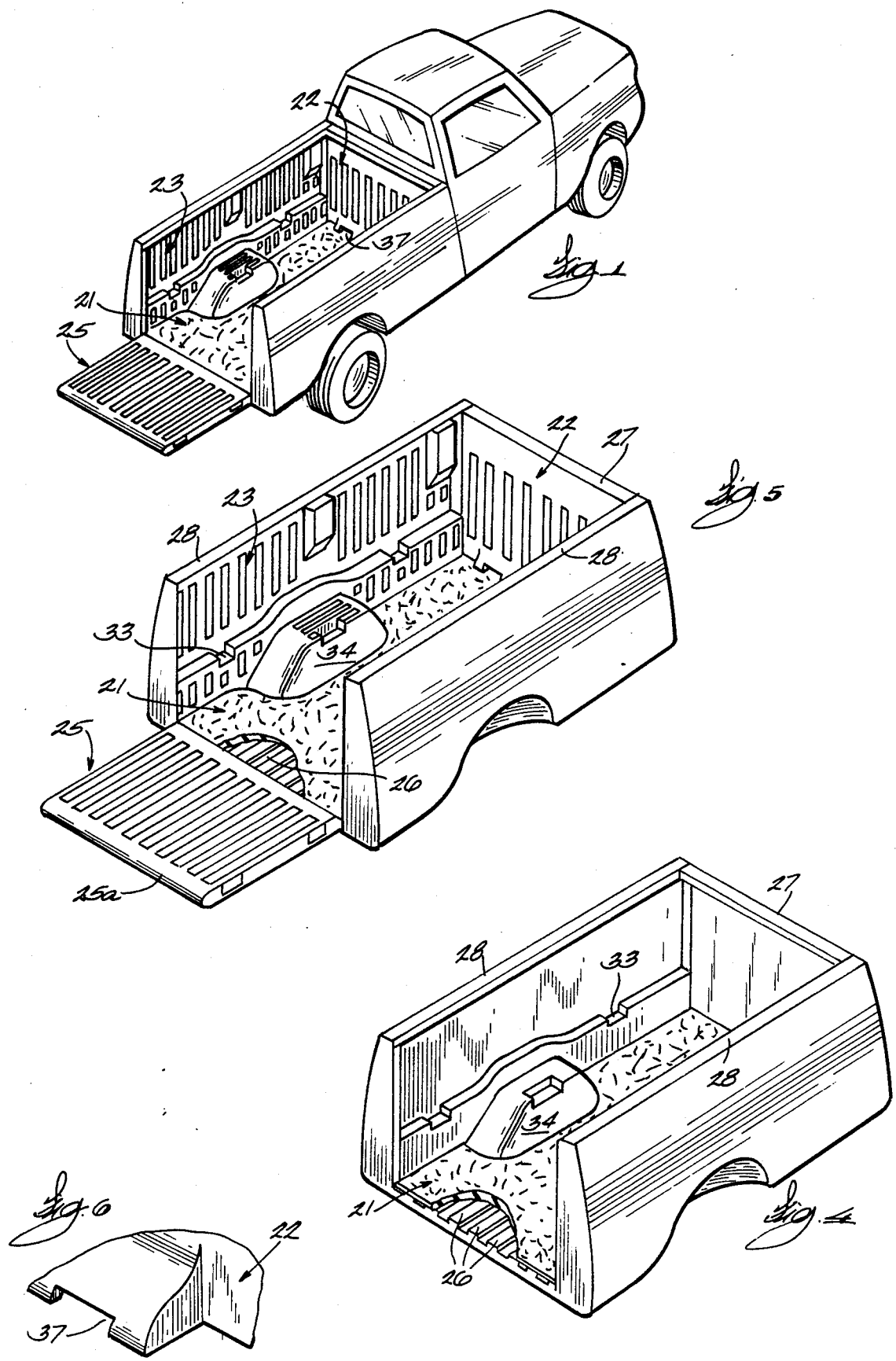

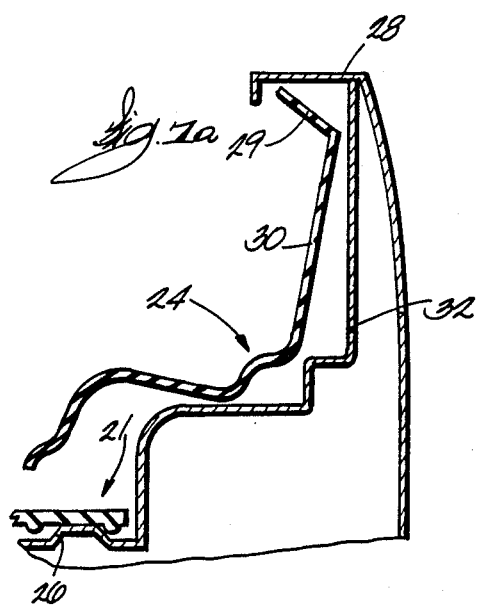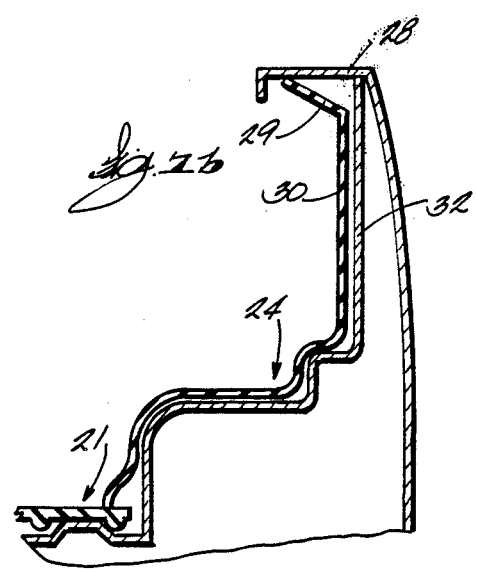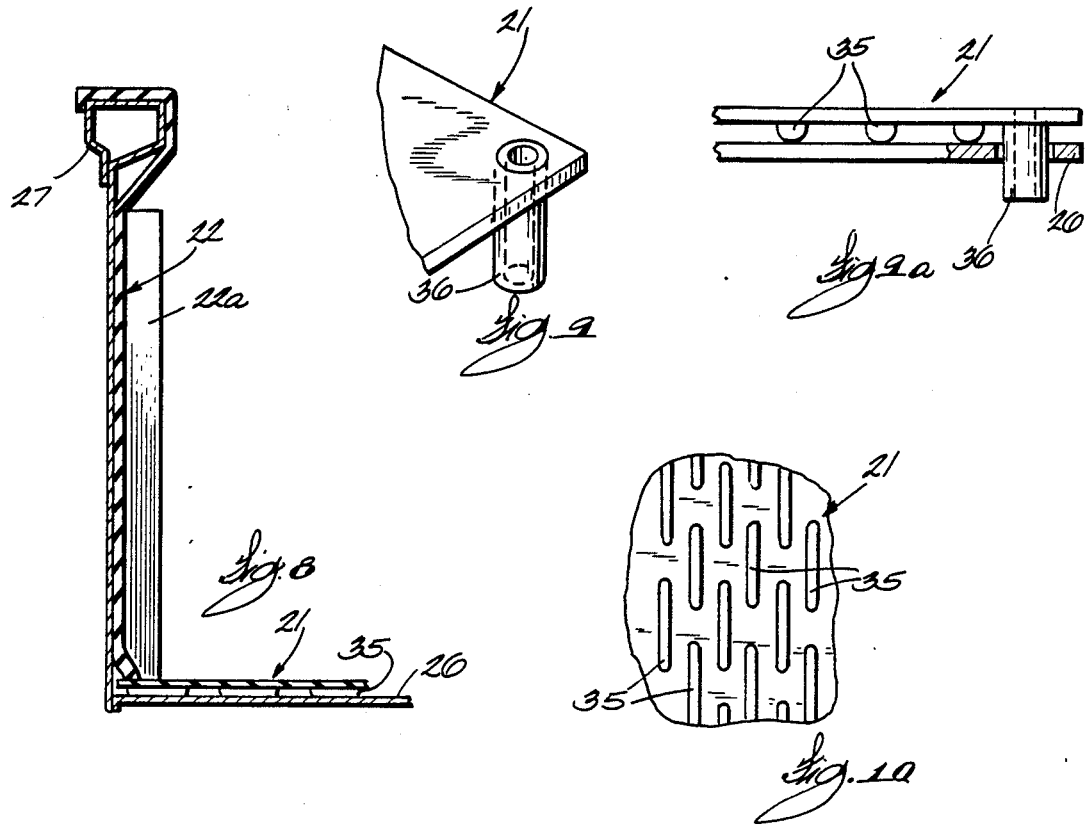

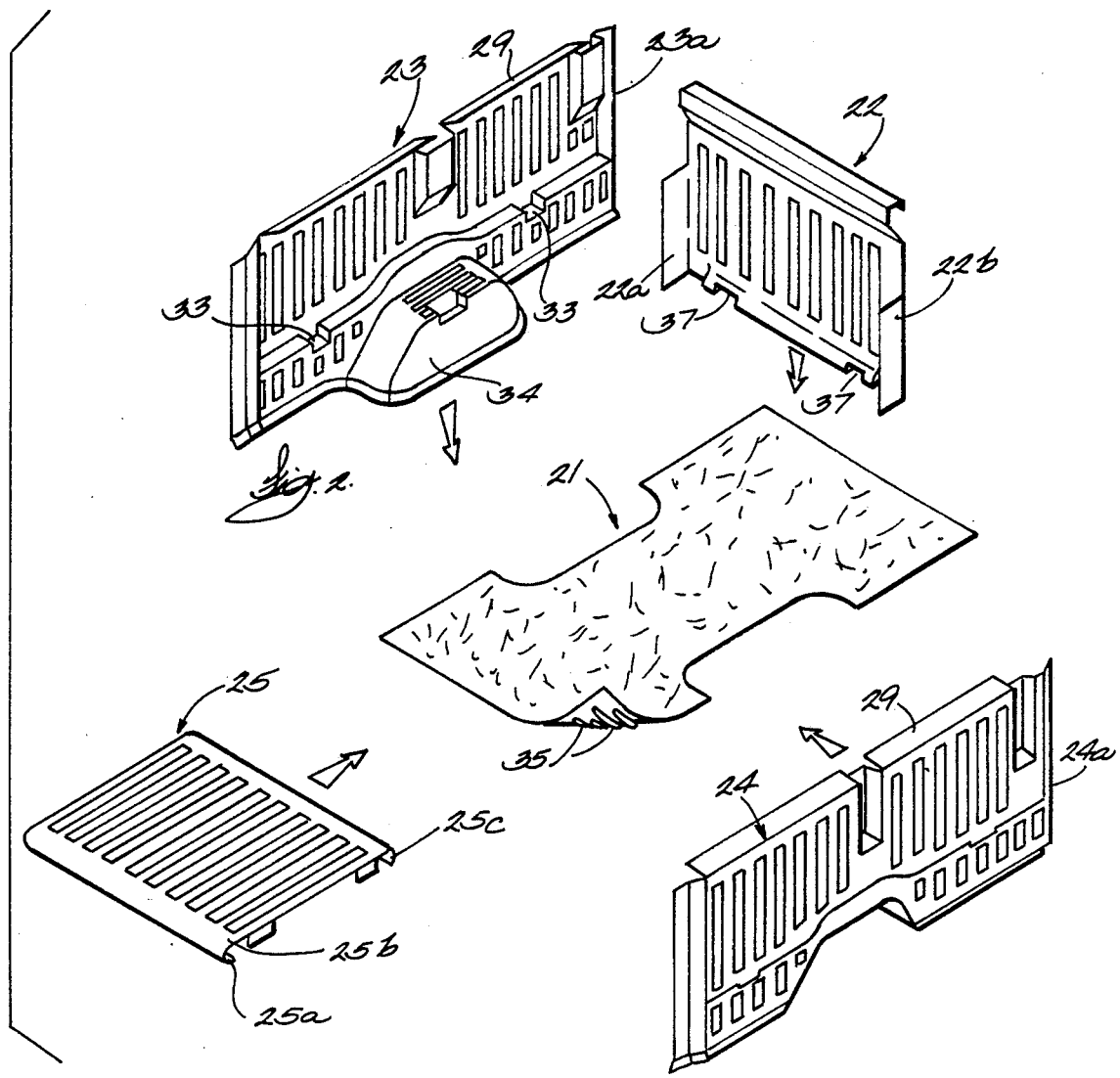
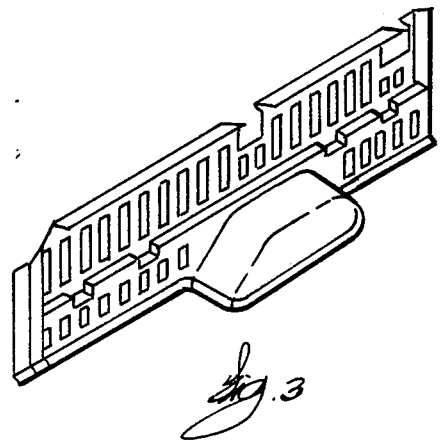

TRUCK BED LINER

The present invention relates to the automotive industry and particularly to the truck industry, and more specifically to open-bodied trucks, such as a pickup vehicle. It has a cab and an open body (no roof or cover) including a bottom, a cab-back panel, two sides, and a tailgate.

More specifically, the present invention relates to a multi-piece bed liner to fit within the body or bed of the truck and protect the metal surfaces thereof.

BACKGROUND OF THE INVENTION

Truck bed liners similar to those of the present invention have long been known in the art and, in fact, are nicely classified in U.S. Patent Office in Class 296/39 (and other relevant classes).

Typical of the relevant subject matter are the inventions disclosed in U.S. Pat. Nos.:
Gardner—3,544,155—70-12-01
Johnson Rubber—3,578,375—71-05-11
Cont. Rubber—3,652,123—71-03-28
Johnson Rubber—3,912,325—75-10-14
Johnson Rubber—3,953,950—76-05-04
Nix —4,111,481—78-09-05
Gray—4,128,271—78-12-05
Richardson,III—4,162,098—79-07-24
Resa—4,188,058—80-02-12
Carter—4,245,863—81-01-20
Munoz et al—4,333,678—82-06-08
Cline—4,396,219—83-08-02
Carter et al—4,505,508—85-03-19
Durakon/McDon.—4,707,016—87-11-17
Van Kirk et al—4,752,097—88-06-21
Shock—4,752,098—88-06-21

The present invention, however, distinguishes from the devices of the prior art, in that the multi-piece construction of the present invention permits the assembly of the side panels, floor panel, cab-back panel, and a tailgate panel, without any fasteners and without separate attachments, and thus permits the snap-in assembly of the various parts with a minimum amount of labor.

SUMMARY OF THE INVENTION

In accordance with the present invention, a five-piece multi-part truck bed liner is provided wherein the floor panel, side panels, cab-back panel and a tailgate panel can be independently and individually used, or any combination of these panels may be assembled, as desired by the owner of the truck.

The multi-piece truck bed liner of the present invention may be assembled and installed by the truck manufacturer or, as is preferred, the components may be purchased from an after-use supplier for installation by the purchaser of the truck or, in some circumstances, may be installed for the purchaser of the truck by an after-use parts supplier.

Thus, a principal object of the present invention is to provide a truck bed liner kit which consists of a plurality of unconnected parts which provide for easy installation, with no attaching or attachment features or elements, can permit the snap-assembly of the truck bed liner elements with no further modification or adjustment on the part of the owner.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

FIG. 1 is a perspective view of an open-bodied truck of the type considered for the truck body liner of the present invention.

FIG. 2 is an exploded view showing the five component elements of the truck body liner of the present invention.

FIG. 3 illustrates a modification of one of the side panels similar to that shown in FIG. 2.

FIG. 4 illustrates how the floor panel can be installed in the body of the truck.

FIG. 5 illustrates how the floor panel, cab-back panel and both left and right side panels are installed in the truck body.

FIG. 6 illustrates the cab-back panel with a water-pass-through opening.

FIG. 7a and 7b illustrate how the side panels are snapped into position in the truck body.

FIG. 8 illustrates the assembly of the cab-back panel in its installed position.

FIG. 9 illustrates the assembly of the water-drain tubes in the floor panel.

FIG. 9a illustrates the assembly of FIG. 9 installed in the truck bed.

FIG. 10 illustrates the floor panel construction which permits drainage of accumulated water beneath the floor panel.

Referring now to FIGS. 1 and 2-5, there is illustrated the truck bed liner of the present invention, which is a multi-piece design, including a bed floor panel 21, a cab-back panel 22, a left-side wall cover 23, a right-side wall cover 24, and a tailgate cover 25.

As is illustrated particularly in FIG. 5, the installation of these panels may be done without the use of any separate fasteners or other mechanical means.

The bed floor panel 21 is designed and shaped in such a way as to match closely the periphery of the truck body to which it is to be applied, and is laid in position on the truck bed floor 26 (see FIG. 5).

The cab-back panel 22 is a one-piece molded component designed to snap over the top flange sheet metal 27 (see FIG. 8), and to be forced into position forward on the bottom of the truck bed against the bed floor panel 21. Rearward-turned flanges 22a and 22b (one on each side of the cab-back panel) are designed to extend rearwardly from each side of the cab-back panel, and subsequently to be overlapped by the left front edges 23a and 24a of the and right bed liner sidewall panels 23 and 24.

The sidewall cover panels 23 and 24 are each of one piece construction and designed to be positioned under the inward-turned sheet metal top flange 28 (see FIGS. 7a and 7b). The top inwardly angled flange 29 on the top 30 of the sidewall cover is forced upwardly against the underside of the inwardly-turned sheet metal top flange 28. Thereafter, the bottom edge 31 is forced outwardly against the truck bed floor panel 21, toward the vertical side sheet metal panel 32. These panels are generally C-shaped in cross-section.

Once the sidewall cover has been forced into position, it is held in place by the downward force applied by its top inwardly angled flange 29, and thus forced downwardly against the soft truck bed floor panel 21. The sidewall cover panels are designed to follow closely the truck box sheet metal configuration, and to maintain and utilize any special features which are part of the sheet metal design. These may be the portions 33, which are molded as depressions to fit into the 2×4 or 2×6 cross-rail seats provided in most of the open-bodied truck configurations. On cross rails fitted into these seats, one may stack such objects as plywood sheets above the truck wheel humps 34.

The truck bed liner assembly thus includes a bed floor cover panel, cab-back cover panel and right and left sidewall cover panels. These may be produced of a raw material which consists of a blend of thermo-plastic polyolefin and reclaimed rubber products.

The truck bed floor panel preferably is produced of raw material consisting of a blend of thermoplastic polyolefin and reclaimed rubber products containing at least 51% of reclaimed rubber material.

The top surface of the truck bed floor panel preferably has a grained, non-smooth finish. The purpose of this type of surface is to hide any surface imperfections, and also to increase the co-efficient of friction. The bottom intermittent off-set ribs 35 (shown in FIG. 10) are designed to allow for the flow of air and/or moisture under the truck bed floor panel so as to prevent moisture trapping and, therefore, reduce corrosion and rusting of the sheet metal bed.

The truck bed liner also may include a bed floor panel which has means for draining the moisture from the top and/or from under the truck bed floor panel. Said drainage means includes a tubular insert 36 which passes through the truck bed floor panel and rests flush with the top surface of the truck bed floor panel as is shown in FIG. 9.

The bottom of the tubular insert may protrude beyond the bottom surface of the panel and beyond the farthest most portion of the bottom ribs 35, through a drainage hole cut into a sheet metal truck bed in alignment with the tubular insert 36.

The outside diameter of the tubular insert is slightly smaller than the diameter of the drainage hole in the sheet metal bed, so as to allow moisture to drain around the tubular insert from under the truck bed floor panel, as well as to drain, through the tubular insert, any moisture which may collect on top of the truck bed floor panel.

The cab-back panel may also include a means for drainage of moisture from the interior of the truck bed. This means includes notches or cut-outs 37 strategically placed along the bottom edge of the cab-back panel. The vertical height of the cut-out preferably is slightly smaller than the opening for the drainage which appears in the sheet metal truck box, so as to insure that if an object is able to pass through the opening in the cab-back panel, it will also pass through the sheet metal opening. Thus any clogging which may occur will be at the interior surface of the cab-back panel, and not behind it in the sheet metal opening. This insures that any clogging material may be easily cleared away.

The truck bed liner may also include a tailgate cover panel 25. This cover consists of a portion 25a which overlaps some portion of the outer area of the sheet metal tailgate, and then turns forward to cover the top surface of the sheet metal tailgate, thereafter, passing downwardly (as at 25b) to cover a major portion of the inside (vertical) surface of the sheet metal tailgate. The cover portion terminates at 25 b-1 generally near the bottom of the inside vertical surface of the sheet metal tailgate. The tailgate cover may also have a bottom cap portion 25c, the top portion of which lies beneath the edge 25 b-1 and may be attached to said cover portion 25b to create a unitary structure. The bottom cap portion 25c is designed to continue downwardly from edge 25 b-1 of the cover panel and then turn rearwardly as at 25 c-1 under the bottom of the sheet metal tailgate.

The tailgate cover panel and the bottom cap preferably are interconnected, and cover substantially all of the inside surface of the sheet metal tailgate with the lateral edges terminating closely adjacent the outer lateral edges of the tailgate sheet metal inner panel. Tabs 25 a-1 prevent side-to-side movement of the portion 25a.

With the foregoing structure in mind, I disclose a multi-piece bed liner which requires no fasteners for attachment to each other or to the vehicle. This bed liner includes side panels which utilize inwardly turned flanges at the top which are constructed as to apply a downward force to enable the panel to stay in position without the use of any mechanical fastening means.

Additionally, the cab-back or front-end panel has a rearwardly extending pair of side tabs which are overlapped by the side panels to enable the cab-back panel to stay in place with no other means of fastening.

It is to be understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention.

Having thus described my invention, what I claim as new and desire to protect by Letters Patent are the following:

1. In a multi-piece snap-in vehicle bed liner characterized in that no fasteners are required for assembly to the vehicle which has a body with sides including inturned top flanges and a floor, said bed liner including:

a right side panel, a left side panel, and a cab-back panel, all of which panels interact for compression and retention within the body of said vehicle beneath the body top flange and the floor, and said side panels being C-shaped in cross section, and each including an in-turned upper edge and also a lower edge, and said side panels constructed and arranged so that they are compressed and retained in place when the in-turned upper edge of the panels are located beneath the in-turned top flange of the vehicle body and when the lower edge of the panel rests on the vehicle floor, and said cab-back panel including flanges which are disposed behind the front edges of the side panels when the side panels are compressed and retained in place, thus to secure the cab-back panel in place.

2. The vehicle bed liner of claim 1 including a floor mat which overlies the floor of said vehicle body.

3. The vehicle bed liner of claim 2 wherein the floor mat has a grained upper surface.

4. The vehicle bed liner of claim 2 wherein the floor mat consists of at least 51% reprocessed rubber material.

5. The vehicle bed liner of claim 2 wherein the floor mat consists of a blend of reprocessed rubber and a polyolefin.

6. In a multi-piece snap-in vehicle bed liner characterized in that no fasteners are required for assembly to the vehicle which has a body with sides including inturned top flanges and a floor, said bed liner including:

a right side panel, a left side panel, and a cab back panel, all of which panels interact for compression and retention within the body of said vehicle beneath the body top flange and the floor, and said side panels being C-shaped in cross section, and each including an inturned upper edge and also a lower edge, and said side panels constructed and arranged so that they are compressed and retained in place when the inturned upper edge of the panels are located beneath the inturned top flange of the vehicle body and when the lower edge of the panel rests on the vehicle floor, and said cab-back panel including flanges which are disposed behind the front edges of the side panels when the side panels are compressed and retained in place, thus to secure the cab-back panel in place, and floor mat which overlies the floor of said vehicle body, and at least one notch in the lower edge of the cab-back panel strategically placed to permit liquid to drain from the surface of the top of the floor mat.

* * * * *